US012072960B2

(12) United States Patent
Heidenfeldt et al.

(10) Patent No.: US 12,072,960 B2
(45) Date of Patent: Aug. 27, 2024

(54) DYNAMIC MULTIFACTOR AUTHENTICATION USING LOW-POWER AND HIGH-POWER MONITORING

(71) Applicant: LENOVO (SINGAPORE) PTE. LTD, Singapore (SG)

(72) Inventors: Mark Christopher Heidenfeldt, Apex, NC (US); Mark Summerville, Apex, NC (US); Aravind Senthil Murugan, Morrisville, NC (US); Sandy Collins, Durham, NC (US); Justin Michael Riguette, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 268 days.

(21) Appl. No.: 17/828,278

(22) Filed: May 31, 2022

(65) Prior Publication Data
US 2023/0385387 A1  Nov. 30, 2023

(51) Int. Cl.
*G06F 21/31* (2013.01)
*G06F 13/36* (2006.01)
(Continued)

(52) U.S. Cl.
CPC .............. *G06F 21/31* (2013.01); *G06F 13/36* (2013.01); *G06F 21/606* (2013.01); *G06F 21/6218* (2013.01)

(58) Field of Classification Search
CPC ........ G06F 21/31; G06F 13/36; G06F 21/606; G06F 21/6218; G06F 21/32
See application file for complete search history.

(56) References Cited

U.S. PATENT DOCUMENTS

| 2009/0217361 A1* | 8/2009 | Crandell | G06F 21/32 726/5 |
| 2016/0050234 A1* | 2/2016 | Choyi | H04L 63/20 726/1 |

(Continued)

OTHER PUBLICATIONS

Mandyam et al., "Leveraging Contextual Data for Multifactor Authentication in the Mobile Web", Jan. 2015, 7th International Conference on Communication Systems and Networks, pp. 1-4 (Year: 2015).*

(Continued)

*Primary Examiner* — Kenneth W Chang
(74) *Attorney, Agent, or Firm* — Schwegman Lundberg & Woessner, P.A.

(57) ABSTRACT

Access to a system is permitted by first polling a low-power device/connection on a user device for a low-power multifactor authentication (MFA), and; refraining from polling a high-power device/connection on the user device for a high-power MFA. An indication is received from a user that the user would like to access the system. The low-power MFA is identified via the polling of the low-power device/connection, and the user is authenticated via the low-power MFA. After authenticating the user via the low-power MFA, the high-power device/connection is woken and polled for the high-power MFA. The high-power MFA is identified via the polling of the high-power device/connection, and the user is authenticated via the high-power MFA. Access to the system is permitted when the user has been authenticated using the low-power MFA and the high-power MFA.

20 Claims, 3 Drawing Sheets

(51) Int. Cl.
  *G06F 21/60* (2013.01)
  *G06F 21/62* (2013.01)

(56) References Cited

U.S. PATENT DOCUMENTS

2017/0237301 A1* 8/2017 Elad .................... H02J 7/00034
                                                      307/104
2018/0181958 A1* 6/2018 Locke .................. G06Q 20/401
2019/0268329 A1* 8/2019 Toth .................... G06F 21/6209

OTHER PUBLICATIONS

Quintal et al., "Contextual, Behavioral, and Biometric Signatures for Continuous Authentication", Sep. 2019, IEEE Internet Computing, vol. 23, No. 5, pp. 18-28 (Year: 2019).*

* cited by examiner

DYNAMIC MULTIFACTOR AUTHENTICATION USING LOW-POWER AND HIGH-POWER MONITORING

TECHNICAL FIELD

Embodiments disclosed herein generally relate to multifactor authentication, and in an embodiment, but not by way of limitation, multifactor authentication using low-power and high-power monitoring.

BACKGROUND

Current methods for multifactor authentication (MFA) normally rely on a username/password and on some type of data or verification code transfer, generally through a message, phone call, or token. Current MFA methods are divided into three groups—things a user knows, things a user has, and things that the user is. Typically, these MFAs require the user to either remember a username/password, have a token/card/phone on them to retrieve a rotating password, and/or use their voice or fingerprint to log on.

While these manners of authentication are all generally acceptable methods, each of them has its shortcomings. Remembering a pin or password can be a bother to a user and renders a device unusable or in need of reset if they forget. Relying on a token/card or phone also assumes that a user will not forget or lose this item, or worse yet have it stolen. A fingerprint or voice recognition is a good protection method, but they may be better used as one of many options rather than being a required item since there are many instances where users are in loud places or have dirty hands and cannot use these devices. Also, in general, it is not a good user experience for the user to have to collect and input the information (e.g., the user may not have his or her smart phone handy).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

To address the issues discussed above, an embodiment of the present disclosure uses a low-power and a high-power approach to multifactor authentication (MFA). The use of low-power and high-power MFA optionally takes the individual user knowledge and memory out of the authentication equation and expands on current devices used for authentication. Using the environment and devices around the system instead of only passwords and/or pins also assists with device security. In this embodiment, a combination of a connection first to a low-powered item and then to a high-powered item allows a user or a device to access the system. Also, multiple options from each of the low-powered and high-powered items can be used.

At a high level, an embodiment, instead of looking for and/or polling every possible means of authentication associated with a device, uses a list of low-power devices and polls just those low-power devices. An administrator sets up approved methods of authorization and the combinations of low-power and high-power MFAs that are sufficient for access to the system are stored in a file or register. The list is used as basis for all factor combinations and weights of power draw when the device goes into low-power state. This conserves the charge on the battery in a mobile device. After a successful authentication by one or more low-power devices, the system then wakes up and polls the high-power devices in the list. This process contrasts with current systems, which poll all devices all the time. This embodiment is possible because modern day devices are always in at least a low-power state. That is, current devices are in a standby instead of a shutdown state. The devices are active at some level, and not just clock and power functions.

Figure 1A:
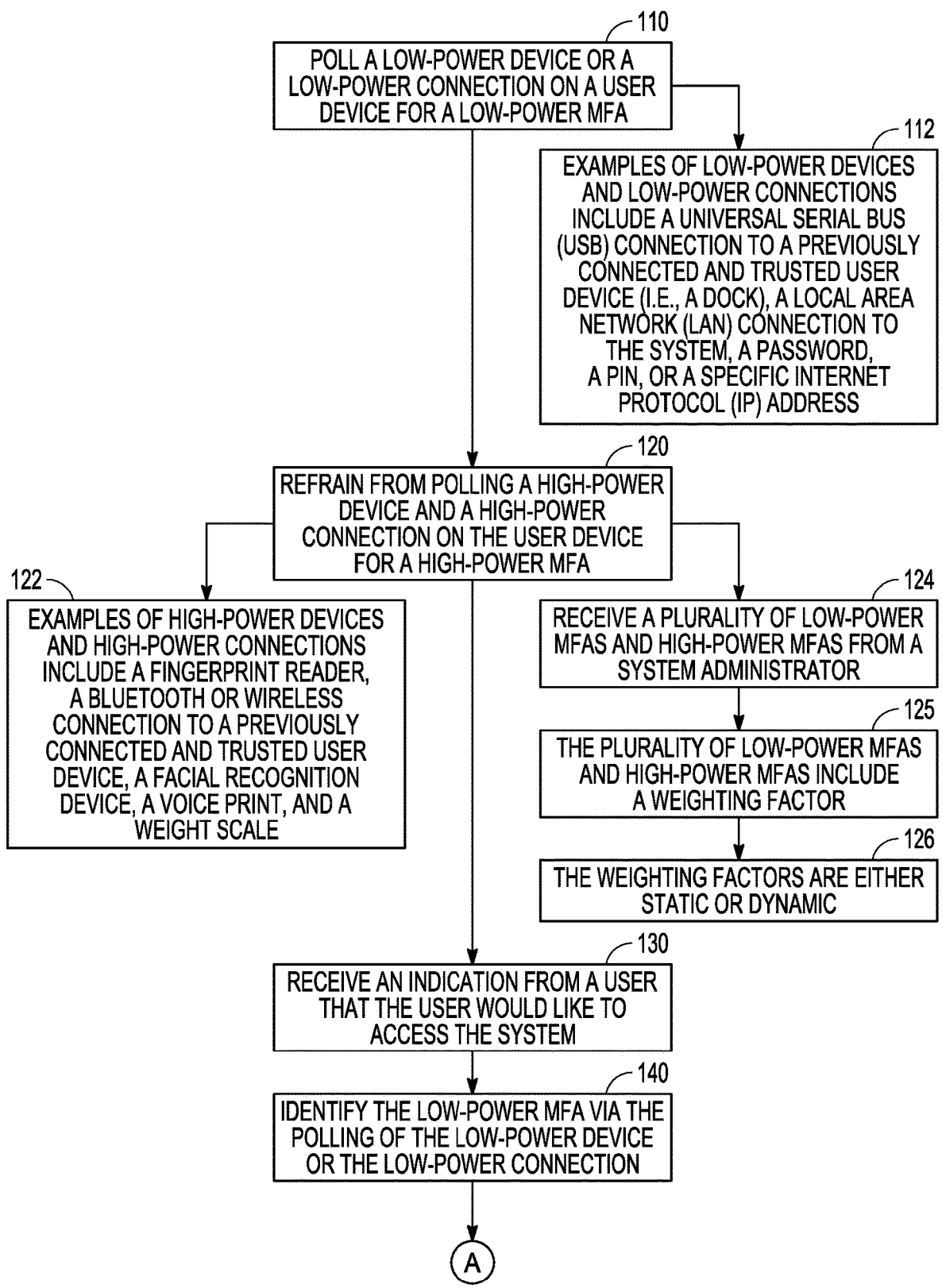
FIGS. 1A and 1B are a block diagram illustrating operations and features of a system to dynamically authenticate a user using high-power and low-power multifactor authentication.
Figure 1B:
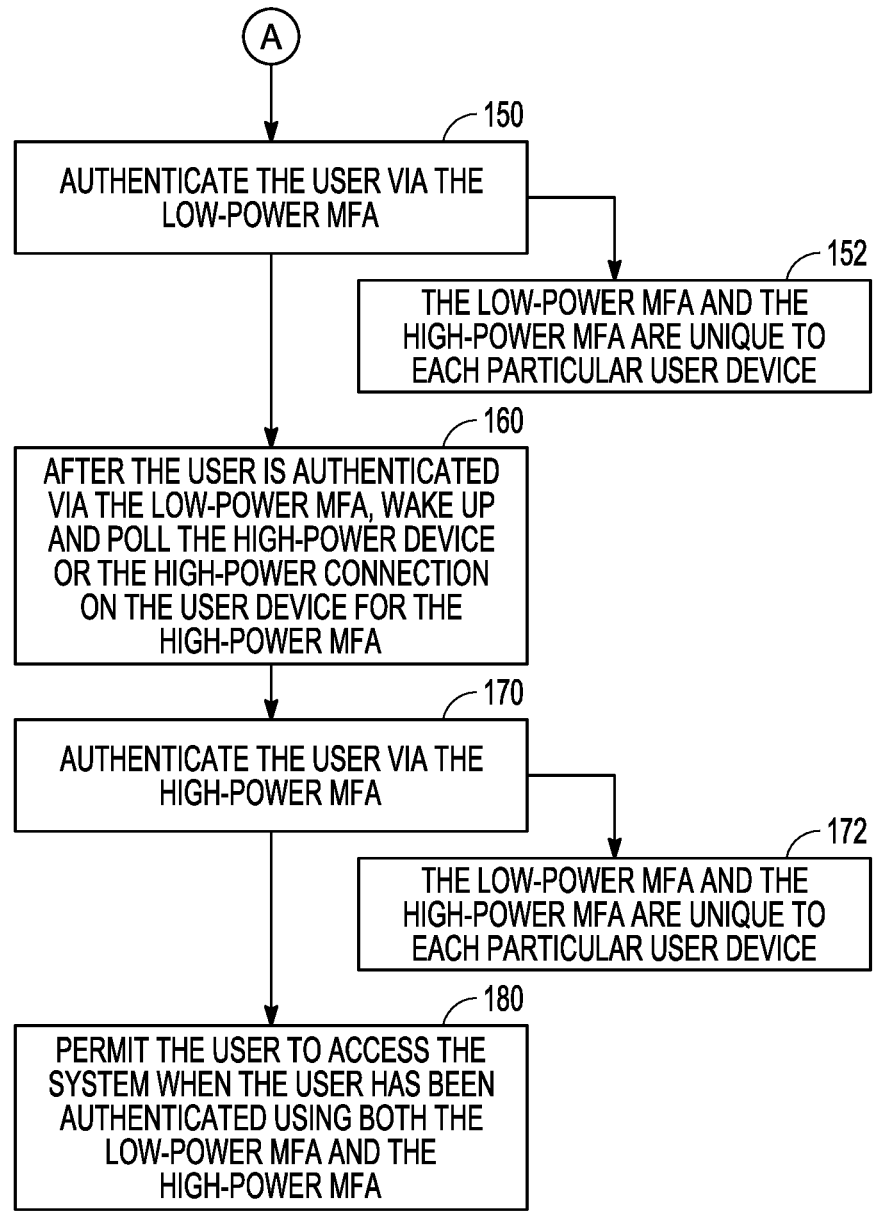

FIGS. 1A and 1B are a block diagram illustrating operations and features of a system to dynamically authenticate a user using low-power and high-power multifactor authentication. FIGS. 1A and 1B include a number of feature and process blocks 110-180. Though arranged substantially serially in the example of FIGS. 1A and 1B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 1A and 1B, at 110, a low-power device or a low-power connection on a user device is polled for a low-power multifactor authentication (MFA). As noted at 120, while this polling of the low-power device or low-power connection is executing, the system refrains from polling a high-power device and a high-power connection on the user device for a high-power MFA. This refraining from polling conserves the charge of the battery on the user device, which contrasts with present day devices, which continuously poll all authentication avenues and continuously draw down the charge on the battery. As indicated at 112, examples of low-power devices and low-power connections include a universal serial bus (USB) connection to a previously connected and trusted user device (i.e., a dock), a local area network (LAN) connection to the system, a password, a pin, or a specific Internet Protocol (IP) address. Examples of high-power devices and high-power connections include a fingerprint reader, a Bluetooth or wireless connection to a previously connected and trusted user device, a facial recognition device, a voice print, and a weight scale (for reading and verifying a known weight of a user) (122).

At 130, an indication is received from a user that the user would like to access the system. This indication could be something as simple and common as entering a username followed by a password. At 140, the system identifies the low-power MFA via the polling of the low-power device or the low-power connection, and at 150, the system authenticates the user via the low-power MFA.

At 160, after the user is authenticated via the low-power MFA, the high-power device or the high-power connection on the user device is woken up and polled for the high-power MFA. The high-power MFA is then identified via the polling of the high-power device or the high-power connection, and at 170, the user is authenticated via the high-power MFA. As indicated at 152 and 172, the low-power MFA and the high-power MFA can be unique to each particular user device. This uniqueness can further include unique combinations and weighting of the low-power MFA and the high-power MFA. Finally, at 180, the user is permitted to access the system when the user has been authenticated using both the low-power MFA and the high-power MFA.

Further referring to FIGS. 1A and 1B, as noted at 124, in an embodiment, there are a plurality of low-power MFAs and high-power MFAs. These multiples of low-power and high-power MFAs are normally received from and maintained by a system administrator. These several low-power MFAs and high-power MFAs can be used in multiple different combinations for permitting access to the system. For example, a first combination could include a low-power username/password followed by a high-power fingerprint of the user, and a second combination could include a low-power USB connection to a previously connected and trusted user device followed by a high-power voice print of the user. As noted above at operation 180, the entire combination would have to be satisfied before a user is allowed access to the system.

Additionally, as indicated at 125, each of the plurality of low-power MFAs and high-power MFAs can include a weighting factor. As further noted at 126, these weighting factors can be either static (hard-coded and unchanging in the system) or dynamic (determined at run time by a power consumption measurement or similar means). The dynamic method can be useful in several environments and situations. For example, it can be useful in a situation where an authentication factor that has dynamic power consumption depends on environmental factors, such as with a wireless radio that consumes more power communicating with a weak/distant router than with a close router. As another example, an embodiment can be implemented without individually profiling authentication factors a priori, which can reduce research and development costs. For example, in a situation where an Android is involved, an embodiment could support hundreds of smartphone models in which each has multiple vendors for factors (touchscreen vendors, WLAN vendors, fingerprint reader vendors, etc.), and every factor vendor would have a unique power draw.

Additionally, the use of weighting allows the definition of "low" and "high" power factors to vary by each device and/or implementation. Therefore, the indications of "low' and "high" are not absolute, but rather relative. A low-power factor for one device might very well be a high-power factor for another device. The weighting also allows arbitrary factors to be used.

Figure 2:
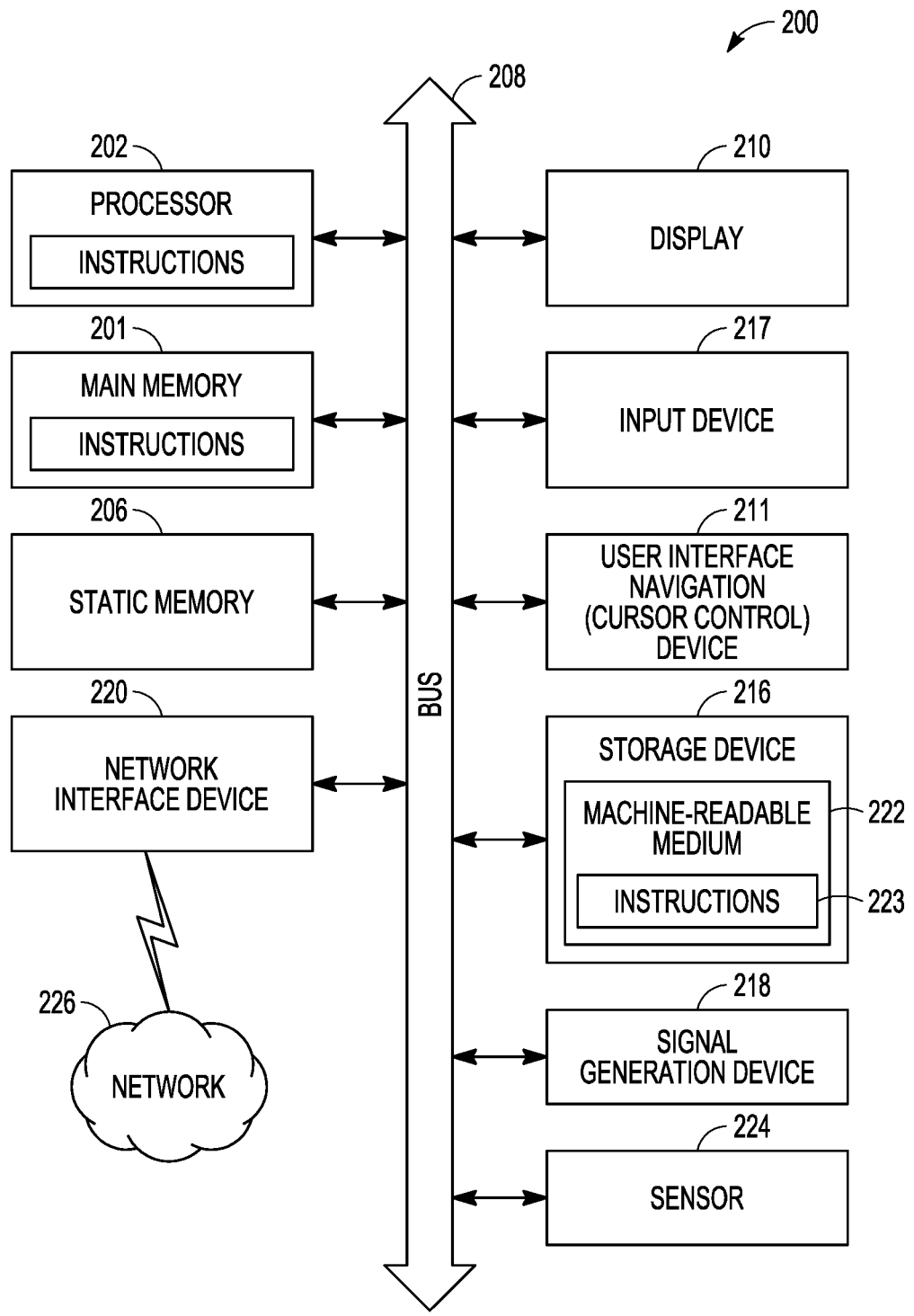
FIG. 2 is a block diagram of a computer architecture that can be used in connection with one or more embodiments of the current disclosure.

FIG. 2 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a personal computer (PC), however, in alternative embodiments, the machine may be a server computer, a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 201 and a static memory 206, which communicate with each other via a bus 208. The computer system 200 may further include a display unit 210, an alphanumeric input device 217 (e.g., a keyboard), and a user interface (UI) navigation device 211 (e.g., a mouse). In one embodiment, the display, input device and cursor control device are a touch screen display. The computer system 200 may additionally include a storage device 216 (e.g., drive unit), a signal generation device 218 (e.g., a speaker), a network interface device 220, and one or more sensors 224, such as a global positioning system sensor, compass, accelerometer, or other sensor.

The drive unit 216 includes a machine-readable medium 222 on which is stored one or more sets of instructions and data structures (e.g., software 223) embodying or utilized by any one or more of the methodologies or functions described herein. The software 223 may also reside, completely or at least partially, within the main memory 201 and/or within the processor 202 during execution thereof by the computer system 200, the main memory 201 and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 223 may further be transmitted or received over a communications network 226 using a transmission medium via the network interface device 220 utilizing any one of a number of well-known transfer protocols (e.g., HTTP). Examples of communication networks include a local area network ("LAN"), a wide area network ("WAN"), the Internet, mobile telephone networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example No. 1 is a process for permitting access to a system including polling a low-power device or a low-power connection on a user device for a low-power multifactor authentication (MFA); refraining from polling a high-power device and a high-power connection on the user device for a high-power MFA; receiving an indication from a user that the user would like to access the system; identifying the low-power MFA via the polling of the low-power device or the low-power connection; authenticating the user via the low-power MFA; after authenticating the user via the low-power MFA, waking up and polling the high-power device or the high-power connection on the user device for the high-power MFA; identifying the high-power MFA via the polling the high-power device or the high-power connection; authenticating the user via the high-power MFA; and permitting access to the system by the user when the user has been authenticated using the low-power MFA and the high-power MFA.

Example No. 2 includes all the features of Example No. 1, and optionally includes a plurality of low-power MFAs and high-power MFAs, the plurality of low-power and high-power MFAs being received from a system administrator.

Example No. 3 includes all the features of Example Nos. 1-2, and optionally includes a plurality of combinations of the low-power MFAs and high-power MFAs that are required for permitting the user to access the system.

Example No. 4 includes all the features of Example Nos. 1-3, and optionally includes a process wherein each of the plurality of low-power MFAs and high-power MFAs comprise a weighting factor.

Example No. 5 includes all the features of Example Nos. 1-4, and optionally includes a process wherein the weighting factor is static or the weighting factor is determined dynamically.

Example No. 6 includes all the features of Example Nos. 1-5, and optionally includes a process wherein the low-power MFA and the high-power MFA are unique to the user device.

Example No. 7 includes all the features of Example Nos. 1-6, and optionally includes a process wherein the low-power device and the low-power connection comprise one or more of a universal serial bus (USB) connection to a previously connected and trusted user device, a local area network (LAN) connection to the system, a password, a pin, or a specific Internet Protocol (IP) address.

Example No. 8 includes all the features of Example Nos. 1-7, and optionally includes a process wherein the high-power device and the high-power connection comprise one or more of a fingerprint reader, a Bluetooth or wireless connection to a previously connected and trusted user device, a facial recognition device, a voice print, and a weight scale.

Example No. 9 is a machine-readable medium comprising instructions, that when executed by a processor execute a process for permitting access to a system, including polling a low-power device or a low-power connection on a user device for a low-power multifactor authentication (MFA); refraining from polling a high-power device and a high-power connection on the user device for a high-power MFA; receiving an indication from a user that the user would like to access the system; identifying the low-power MFA via the polling of the low-power device or the low-power connection; authenticating the user via the low-power MFA; after authenticating the user via the low-power MFA, waking up and polling the high-power device or the high-power connection on the user device for the high-power MFA; identifying the high-power MFA via the polling the high-power device or the high-power connection; authenticating the user via the high-power MFA; and permitting access to the system by the user when the user has been authenticated using the low-power MFA and the high-power MFA.

Example No. 10 includes all the features of Example No. 9, and optionally includes a plurality of low-power MFAs and high-power MFAs, the plurality of low-power and high-power MFAs being received from a system administrator.

Example No. 11 includes all the features of Example Nos. 9-10, and optionally includes a plurality of combinations of the low-power MFAs and high-power MFAs that are required for permitting the user to access the system.

Example No. 12 includes all the features of Example Nos. 9-11, and optionally includes wherein each of the plurality of low-power MFAs and high-power MFAs comprise a weighting factor.

Example No. 13 includes all the features of Example Nos. 9-12, and optionally includes wherein the weighting factor is static or the weighting factor is determined dynamically.

Example No. 14 includes all the features of Example Nos. 9-13, and optionally includes wherein the low-power MFA and the high-power MFA are unique to the user device.

Example No. 15 includes all the features of Example Nos. 9-14, and optionally includes wherein the low-power device and the low-power connection comprise one or more of a universal serial bus (USB) connection to a previously connected and trusted user device, a local area network (LAN) connection to the system, a password, a pin, or a specific Internet Protocol (IP) address.

Example No. 16 includes all the features of Example Nos. 9-15, and optionally includes wherein the high-power device and the high-power connection comprise one or more of a fingerprint reader, a Bluetooth or wireless connection to a previously connected and trusted user device, a facial recognition device, a voice print, and a weight scale.

Example No. 17 is a system including a computer processor; and a memory coupled to the computer processor; wherein the computer processor is operable for polling a low-power device or a low-power connection on a user device for a low-power multifactor authentication (MFA); refraining from polling a high-power device and a high-power connection on the user device for a high-power MFA; receiving an indication from a user that the user would like to access the system; identifying the low-power MFA via the polling of the low-power device or the low-power connection; authenticating the user via the low-power MFA; after authenticating the user via the low-power MFA, waking up and polling the high-power device or the high-power connection on the user device for the high-power MFA; identifying the high-power MFA via the polling the high-power device or the high-power connection; authenticating the user via the high-power MFA; and permitting access to the system by the user when the user has been authenticated using the low-power MFA and the high-power MFA.

Example No. 18 includes all the features of Example No. 17, and optionally includes a plurality of low-power MFAs and high-power MFAs, the plurality of low-power and high-power MFAs being received from a system administrator; and a plurality of combinations of the low-power MFAs and high-power MFAs that are required for permitting the user to access the system; wherein each of the plurality of low-power MFAs and high-power MFAs comprise a weighting factor; and wherein the weighting factor is static or the weighting factor is determined dynamically.

Example No. 19 includes all the features of Example Nos. 17-18, and optionally includes wherein the low-power MFA and the high-power MFA are unique to the user device.

Example No. 20 includes all the features of Example Nos. 17-19, and optionally includes wherein the low-power device and the low-power connection comprise one or more of a universal serial bus (USB) connection to a previously connected and trusted user device, a local area network (LAN) connection to the system, a password, a pin, or a specific Internet Protocol (IP) address; and wherein the high-power device and the high-power connection comprise one or more of a fingerprint reader, a Bluetooth or wireless connection to a previously connected and trusted user device, a facial recognition device, a voice print, and a weight scale.

The invention claimed is:

1. A process for permitting access to a system comprising:
   polling a low-power device or a low-power connection on a user device for a low-power multifactor authentication (MFA);
   refraining from polling a high-power device and a high-power connection on the user device for a high-power MFA;
   receiving an indication from a user that the user would like to access the system;
   identifying the low-power MFA via the polling of the low-power device or the low-power connection;
   authenticating the user via the low-power MFA;
   after authenticating the user via the low-power MFA, waking up and polling the high-power device or the high-power connection on the user device for the high-power MFA;
   identifying the high-power MFA via the polling the high-power device or the high-power connection;
   authenticating the user via the high-power MFA; and
   permitting access to the system by the user when the user has been authenticated using the low-power MFA and the high-power MFA.

2. The process of claim 1, comprising a plurality of low-power MFAs and high-power MFAs, the plurality of low-power and high-power MFAs being received from a system administrator.

3. The process of claim 2, comprising a plurality of combinations of the low-power MFAs and high-power MFAs that are required for permitting the user to access the system.

4. The process of claim 2, wherein each of the plurality of low-power MFAs and high-power MFAs comprise a weighting factor.

5. The process of claim 4, wherein the weighting factor is static or the weighting factor is determined dynamically.

6. The process of claim 1, wherein the low-power MFA and the high-power MFA are unique to the user device.

7. The process of claim 1, wherein the low-power device and the low-power connection comprise one or more of a universal serial bus (USB) connection to a previously connected and trusted user device, a local area network (LAN) connection to the system, a password, a pin, or a specific Internet Protocol (IP) address.

8. The process of claim 1, wherein the high-power device and the high-power connection comprise one or more of a fingerprint reader, a Bluetooth or wireless connection to a previously connected and trusted user device, a facial recognition device, a voice print, and a weight scale.

9. The process of claim 1, comprising a plurality of low-power devices and connections and a plurality of high-power devices and connections, and wherein the polling of the low-power devices and connections and the polling of the high-power devices and connections are configurable by a system administrator.

10. A non-transitory machine-readable medium comprising instructions, that when executed by a processor execute a process for permitting access to a system, comprising:
   polling a low-power device or a low-power connection on a user device for a low-power multifactor authentication (MFA);
   refraining from polling a high-power device and a high-power connection on the user device for a high-power MFA;
   receiving an indication from a user that the user would like to access the system;
   identifying the low-power MFA via the polling of the low-power device or the low-power connection;
   authenticating the user via the low-power MFA;
   after authenticating the user via the low-power MFA, waking up and polling the high-power device or the high-power connection on the user device for the high-power MFA;
   identifying the high-power MFA via the polling the high-power device or the high-power connection;
   authenticating the user via the high-power MFA; and
   permitting access to the system by the user when the user has been authenticated using the low-power MFA and the high-power MFA.

11. The non-transitory machine-readable medium of claim 10, comprising a plurality of low-power MFAs and high-power MFAs, the plurality of low-power and high-power MFAs being received from a system administrator.

12. The non-transitory machine-readable medium of claim 11, comprising a plurality of combinations of the low-power MFAs and high-power MFAs that are required for permitting the user to access the system.

13. The non-transitory machine-readable medium of claim 11, wherein each of the plurality of low-power MFAs and high-power MFAs comprise a weighting factor.

14. The non-transitory machine-readable medium of claim 11, wherein the weighting factor is static or the weighting factor is determined dynamically.

15. The non-transitory machine-readable medium of claim 10, wherein the low-power MFA and the high-power MFA are unique to the user device.

16. The non-transitory machine-readable medium of claim 10, wherein the low-power device and the low-power connection comprise one or more of a universal serial bus (USB) connection to a previously connected and trusted user device, a local area network (LAN) connection to the system, a password, a pin, or a specific Internet Protocol (IP) address.

17. The non-transitory machine-readable medium of claim 10, wherein the high-power device and the high-power connection comprise one or more of a fingerprint reader, a Bluetooth or wireless connection to a previously connected and trusted user device, a facial recognition device, a voice print, and a weight scale.

18. A system comprising:
   a computer processor; and
   a memory coupled to the computer processor;
   wherein the computer processor is operable for:
      polling a low-power device or a low-power connection on a user device for a low-power multifactor authentication (MFA);
      refraining from polling a high-power device and a high-power connection on the user device for a high-power MFA;
      receiving an indication from a user that the user would like to access the system;
      identifying the low-power MFA via the polling of the low-power device or the low-power connection;
      authenticating the user via the low-power MFA;
      after authenticating the user via the low-power MFA, waking up and polling the high-power device or the high-power connection on the user device for the high-power MFA;
      identifying the high-power MFA via the polling the high-power device or the high-power connection;
      authenticating the user via the high-power MFA; and
      permitting access to the system by the user when the user has been authenticated using the low-power MFA and the high-power MFA.

19. The system of claim 18, comprising:
   a plurality of low-power MFAs and high-power MFAs, the plurality of low-power and high-power MFAs being received from a system administrator; and
   a plurality of combinations of the low-power MFAs and high-power MFAs that are required for permitting the user to access the system;
   wherein each of the plurality of low-power MFAs and high-power MFAs comprise a weighting factor; and
   wherein the weighting factor is static or the weighting factor is determined dynamically.

20. The system of claim 18, wherein the low-power MFA and the high-power MFA are unique to the user device.

* * * * *